March 24, 1953  F. M. STEPHENS ET AL  2,632,523
GAS SEPARATOR
Filed Jan. 19, 1951
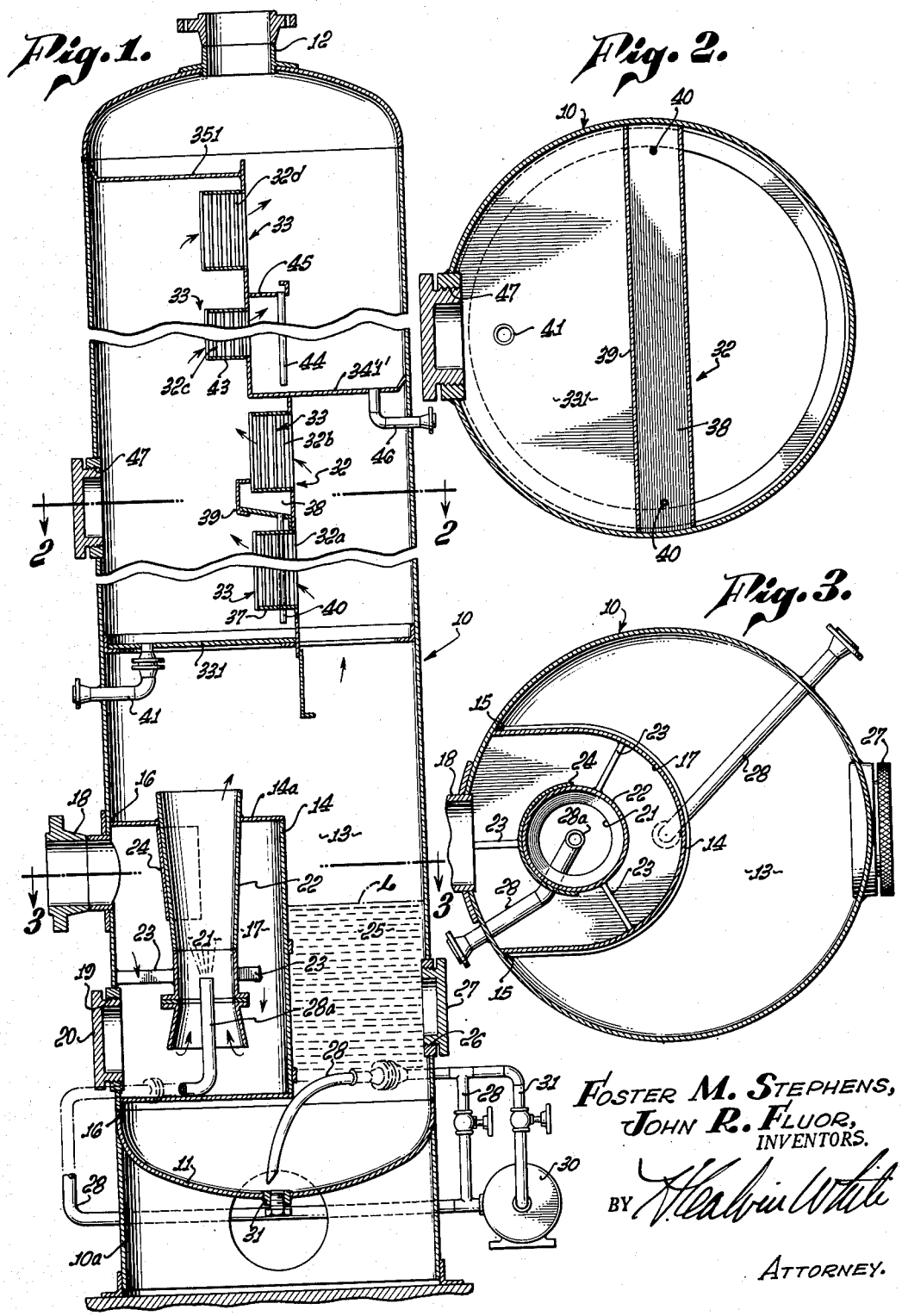
Foster M. Stephens,
John R. Fluor,
INVENTORS.
BY
ATTORNEY.

Patented Mar. 24, 1953

2,632,523

UNITED STATES PATENT OFFICE 2,632,523

GAS SEPARATOR

Foster M. Stephens, Monterey Park, and John R. Fluor, Whittier, Calif., assignors to The Fluor Corporation, Ltd., Los Angeles, Calif., a corporation of California Application January 19, 1951, Serial No. 206,874

6 Claims. (Cl. 183—22)

1

This invention has to do with gas scrubbers, separators and cleaners adapted particularly for the removal from gas of entrained dusts or solid dirts, alone or together with entrained liquids. Particularly contemplated are improvements in separators of the general type operating to effect dirt removal by wetting the dirt particles, and to remove from the gas stream entrained liquid carry-over from the initial liquid contacting and particle wetting stage.

Structurally, the invention is concerned primarily with a novel system for effecting intimate contact between the contaminated gas and the particle wetting liquid, and in a manner permitting continuous circulation of the liquid from and back to an accumulated body through a separate gas-liquid contacting chamber, all incorporated in a single outer shell structure.

In accordance with the invention, the separator parts are accommodated within a vertically extending shell containing within its lower portion a body of the wetting liquid and a chamber receiving the inlet gas and containing or communicating with a mixing passage, preferably of Venturi shape, through which the gas flows into the bottom liquid-containing shell chamber. Preferably the inlet gas chamber is formed using an inside shell substantially closed from the liquid chamber except through the mixing passage, and a conduit through which the liquid undergoes circulation to and from the liquid body by way of the mixing passage.

As will appear, by placing the mixing passage or venturi to extend upwardly through the top of the inlet gas chamber, the gas-liquid mixture is discharged into the base outer shell chamber in a manner permitting gravity separation from the gas of the bulk of the liquid so that the latter accumulates in the liquid body below, for repeated recirculation. Provision is made for removing entrained liquid remaining in the gas by providing within the upper interior of the shell, appropriate separating means preferably in the form of one or more separator units arranged between staggered baffle floors.

All the various features and objects of the invention, as well as other details of a typical and illustrative embodiment, will be made apparent in the following detailed description of the accompanying drawing, in which:

In the drawing, the separator is shown to comprise a vertically extended cylindrical shell 10 having a supporting base 10a below the shell bottom 11, and a gas outlet 12 at the top. The shell contains a bottom chamber 13 within which is

2 accommodated an inner closed shell 14 offset to one side of the chamber 13, with the edges of the shell welded at 15 and 16 to the outer shell 10. The inner shell 14 encloses a chamber 17 which receives through inlet 18, gas carrying entrainment such as finely divided dust and dirt particles. Access to chamber 17 for clean-out or other purposes, is had through an opening 19 having a removable closure 20.

The inlet gas is subjected to intimate mixing with liquid such as oil, in a passage 21 formed by a vertically positioned tube 22, preferably in the form of a venturi, supported centrally within chamber 17 by supports 23, the upper end of the venturi extending through the top 14a of the shell, as illustrated. A wear plate 24 may be applied to the venturi opposite the inlet 18 to resist the eroding action of the impinging inlet gas. Upon entering chamber 17, the gas flows around and downwardly about the mixing tube, and then reverses its flow in entering and passing upwardly through the tube into the outer shell chamber 13.

Chamber 13 contains a body of oil 25 at a normal level L so that at least the lower extent of the inner shell 14 is submerged in the oil. Access to chamber 14 for inspection or other purposes may be had through opening 26 after removing its closure 27. Provision is made for continuously supplying oil from body 25 to the gas stream within the mixing passage 21, as by way of pipe 28 extending from the bottom of chamber 13 to the outside of the shell 10, and then returning into chamber 17 where the terminal 28a of the pipe extends vertically within and in axial alinement with the venturi 22. The oil flow through pipe 28 into the venturi may occur solely under the influence of gravity and the gas induction effect in the mixing passage 21, or provision may be made for giving the oil positive circulation, as by a pump 30 in a by-pass line 31.

In discharging from end 28a of the recirculation pipe, the oil undergoes intimate and turbulent mixing with the gas in passage 21, to a degree insuring thorough and complete wetting of all gas-entrained particles by the oil. Upon being discharged from the venturi into chamber 13, the bulk of the gas-dispersed oil together with the liquid-wetted solids in the gas stream, settle downwardly and accumulate within the liquid body 25. At such time as the solid accumulations in the oil may become excessive, the oil may be drawn off through the drain outlet 31 partially or entirely, and replaced with clean oil.

Provision is made within the upper interior of the shell 10 for removing all residual entrainment from the gas flowing to the outlet 12. It is to be understood that broadly speaking, the invention contemplates the use of any suitable gas separating or scrubbing means capable of accommodation within the top section of the shell. Preferably, however, we use and find it advantageous to employ one or more scrubber units, generally indicated at 32 positioned between horizontally extending and vertically spaced floors or horizontal baffle walls 331, 341 and 351 extending part way and in staggered relation across the shell, all as illustrated in Fig. 1. The scrubber units 32 may comprise nests 33 of spaced, vertically extending baffle elements through which the gas flows transversely in the general course as indicated by the arrows. Liquid removed from the gas by the baffles in the nest 32a, drains to the bottom plate 37 for collection in chamber 38. Similarly, liquid draining from baffle nest 32b into space 36 enclosed by the plate structure 39, drains through one or more pipes 40 into chamber 38. Liquid accumulating on the floor 331 is withdrawn through the drain line 41. Similarly, liquid accumulating on floor 341 by drainage from the bottom plate 43 of the baffle nest 32c, and through pipe 44 from tray 45 receiving any liquid separated by the baffle nest 32d, is withdrawn through the drain line 46. Access to the upper interior of the shell may be had through one or more inspection openings 47.

I claim:

1. A gas separator comprising a vertically extending outer shell defining at its bottom an outer chamber containing a body of liquid, an inner shell enclosing an inner chamber submerged within said body of liquid and located in and at one side of said outer shell, a gas inlet leading into the inner chamber, means forming a mixing passage extending upwardly through the top of said inner shell, and a conduit through which liquid is taken from said body of liquid into said mixing passage to be carried by the gas stream into said outer chamber.

2. A gas separator comprising a vertically extending outer shell defining at its bottom an outer chamber containing a body of liquid, an inner shell enclosing an inner chamber submerged within said body of liquid and located in and at one side of said outer shell, a gas inlet leading into the inner chamber, a Venturi tube forming a mixing passage extending upwardly through the top of said inner shell, and a conduit through which liquid is taken from said body of liquid into said mixing passage to be carried by the gas stream into said outer chamber.

3. A gas separator comprising a vertically extending outer shell defining at its bottom an outer chamber containing a body of liquid, an inner shell enclosing an inner chamber submerged within said body of liquid and located in and at one side of said outer shell, a gas inlet leading into the inner chamber at said side of the shell, a Venturi tube forming a mixing passage extending upwardly through the top of said inner shell, means supporting the Venturi tube in spaced relation to the chamber wall so that the inlet gas flows about and into the lower end of the venturi, and a conduit through which liquid is taken from said body of liquid into said mixing passage to be carried by the gas stream into said outer chamber.

4. A gas separator comprising a vertically extending outer shell defining at its bottom an outer chamber containing a body of liquid, an inner shell having vertically extending edges secured to the inside of said outer shell and forming therewith an inner chamber submerged in and at one side of said body of liquid, a gas inlet leading into the inner chamber, means forming a mixing passage extending upwardly through the top of said inner shell, and a conduit through which liquid is taken from said body of liquid into said mixing passage to be carried by the gas stream into said outer chamber.

5. A gas separator comprising a vertically extending outer shell defining at its bottom an outer chamber containing a body of liquid, an inner shell enclosing an inner chamber submerged within said body of liquid and located in and at one side of said outer shell, a gas inlet leading into the inner chamber, means forming a mixing passage extending upwardly through the top of said inner shell, a conduit through which liquid is taken from said body of liquid into said mixing passage to be carried by the gas stream into said outer chamber, and liquid separating means in the upper interior of the outer shell above said chamber.

6. A gas separator comprising a vertically extending outer shell defining at its bottom an outer chamber containing a body of liquid, an inner shell having vertically extending edges secured to the inside of said outer shell and forming therewith an inner chamber submerged in and at one side of said body of liquid, a gas inlet leading into the inner chamber, means forming a mixing passage extending upwardly through the top of said inner shell, a conduit through which liquid is taken from said body of liquid into said mixing passage to be carried by the gas stream into said outer chamber, a baffle floor extending partially across the outer shell above said chamber, and liquid separating means within the shell above said floor.

FOSTER M. STEPHENS.
JOHN R. FLUOR.

REFERENCES CITED

The following references are of record in the file of this patent:

UNITED STATES PATENTS

| Number | Name | Date |
|---|---|---|
| 992,260 | Rush | May 16, 1911 |
| 2,337,983 | Fisher | Dec. 28, 1943 |
| 2,414,718 | Christensen | Jan. 21, 1947 |